United States Patent [19]

Wang et al.

[11] Patent Number: 5,615,975
[45] Date of Patent: Apr. 1, 1997

[54] METHOD FOR REMEDIATION OF VOLATILE ORGANIC CONTAMINATED SOILS

[75] Inventors: Hugh H. Wang, Gastonia, N.C.; John Parker, Sylvania, Ohio; Paul Przygocki, Southfield, Mich.; Mike Ameel, Bethel Park, Pa.

[73] Assignee: Sandoz Ltd., Basel, Switzerland

[21] Appl. No.: 502,593

[22] Filed: Jul. 14, 1995

[51] Int. Cl.$^6$ ........................................................ B09C 1/08
[52] U.S. Cl. ............................ 405/128; 210/908; 210/909
[58] Field of Search ..................................... 405/128, 129; 106/697; 588/249; 210/747, 751, 908, 909

[56] References Cited

U.S. PATENT DOCUMENTS

| | | | |
|---|---|---|---|
| 4,702,178 | 10/1987 | Welsh | 110/193 |
| 4,738,206 | 4/1988 | Noland | 110/346 |
| 4,993,943 | 2/1991 | Norris et al. | 432/107 |
| 5,116,515 | 5/1992 | Selesnick | 210/744 |
| 5,178,077 | 1/1993 | Norris et al. | 110/347 |
| 5,190,663 | 3/1993 | Fetzer | 210/909 X |
| 5,238,583 | 8/1993 | Fortson | 210/751 |
| 5,265,978 | 11/1993 | Losack | 405/128 |
| 5,318,382 | 6/1994 | Cahill | 405/128 |
| 5,405,509 | 4/1995 | Lomasney et al. | 588/204 X |
| 5,413,714 | 5/1995 | De Filippi et al. | 210/908 X |
| 5,425,881 | 6/1995 | Szejtli et al. | 405/128 X |

*Primary Examiner*—George A. Suchfield
*Attorney, Agent, or Firm*—Robert S. Honor; Carl W. Battle; Carol A. Loeschorn

[57] ABSTRACT

The present invention is a method for the detoxification and/or chemical remediation of soil contaminated with volatile organic compounds. The process comprises treating the soil with the sodium and calcium salts of naphthalene sulfonates, lignosulfonates, their derivatives and mixtures thereof. The volatile organics are then forced from the soil as the soil is more attracted to the admixture than it is to the volatile organic contaminants.

16 Claims, No Drawings

METHOD FOR REMEDIATION OF VOLATILE ORGANIC CONTAMINATED SOILS

FIELD OF THE INVENTION

The present invention relates generally to the field of environmental pollution and the cleanup and control thereof. More specifically, the present invention relates to the remediation of soils containing volatile toxic organic compounds and the environmental cleanup of hazardous wastes.

BACKGROUND OF THE INVENTION

Man and the industrialized world has continually wrought havoc on the natural environment and the public is consistently reminded of the undesirable side effects of the unfettered discharge of industrial wastes and other forms of air, water and soil pollutants. While it is still unclear exactly how much irreparable damage has been done up to this point in time, it is evident that positive steps must be taken to reverse the direction in which today's society is going and every effort must be made to save and rehabilitate that which has been already damaged.

Soil pollution is a major problem which must be addressed in the very near future. Unbridled and thoughtlessly uncontrolled dumpings of solid, liquid and gaseous pollutants find their way into the soil and can remain there for years. Polycyclic hydrocarbons, a common class of chemicals discharged by industries everywhere, possess toxic, mutagenic and carcinogenic properties. Hydrocarbon solvents have been carelessly dumped into the soil for years and problematically remain there with nowhere else to go. Thousands of tons of toxic compounds are buried in the soil every year in huge commercial landfills and these are scattered throughout the surrounding area for miles by rain and sub-surface ground water. Besides industrial and municipal wastes, pesticides, herbicides, and insecticides ultimately end up in the soil and, as they are not readily degradable, persist there for a long time.

Soil pollutants widely prevalent today are known as volatile organic contaminants which are organic compounds such as low molecular weight alkanes, alcohols, amines, amides, acids, sulfites, dioxins, ethylbenzenes and PCBs. Soil decontamination of these compounds as well as other pollutants has been achieved to a limited extent through solvent extraction, coagulation, high pressure cleaning, supercritical fluid extraction, thermal desorptions, soil vapor extraction, incineration and microbial oxidation. Physical means include pumping the ground soil with water followed by air stripping the soil to remove the volatile hydrocarbons, vacuum extraction and site excavation followed by incineration of the contaminated soil.

U.S. Pat. No. 4,738,206 to Noland discloses a process and apparatus for the low temperature thermal stripping of volatile organic contaminants from the soil. The contaminated soil is heated under negative pressure and is passed through a hollow screw conveyor with hot oil. The soil/oil composition generates combustion gases containing the volatile organic compounds which are removed from the system using a temperature gradient.

U.S. Pat. No. 4,702,178 to Welsh teaches an emergency exhaust system for an industrial hazardous waste incinerator including means for the conveyance of contaminated wastes under a series of rakes and infrared heating elements whereby the solid toxic waste materials are oxidized through the application of intense heat to combustion gases which are drawn off and removed.

U.S. Pat. Nos. 4,993,943 and 15,178,077 to Norris discloses a screw conveyor apparatus and soil purification process in which volatile organic contaminants are removed from the soil by guiding and agitating the soil with the screw conveyor while at the same time heating the soil with infrared radiation which volatizes the organic contaminants which are then driven off by venting the chamber with an oxidizing, reducing or inert gas.

U.S. Pat. No. 5,425,881 to Szejtli, et al. discloses a method for the extraction of organic pollutants from contaminated soils comprised of mixing the contaminated soil with an aqueous solution of cyclodextrins and their derivatives. The cyclodextrins and their derivatives allegedly desorb the toxic organic compounds from the soil and keep them in a solubilized form which is based on the formation of an inclusion complex by the molecules. The soil is then inoculated with a bacteria or fungal culture capable of biodegrading the organic pollutants. The solubilized inclusion complex makes the organic contaminants more susceptible to this biodegradation.

Finally, Szejtli; et al. also describes another attempt at the enhancement of pollutant biodegradation in the soil by increasing the bioavailability of the organic contaminants through desorption of the soil. Desorption is carried out by chemically treating it with a hydroxylating reagent ($H_2O_2$—$Fe^2$), a surface active agent or other solvent.

None of these prior art methods efficiently and cost-effectively remove highly volatile organic contaminants from the soil so as to purify it to its natural state without left-over solvent or combustion residues. Nor does any of the prior art provide a simplistic, cost effective method that can be used to clean large scale pollution problems rendering the otherwise toxic soil suitable for agricultural and livestock applications.

SUMMARY OF THE INVENTION

The present invention is a method for the detoxification and/or chemical remediation of soil contaminated with volatile organic compounds. The process comprises treating the soil with the sodium and calcium salts of naphthalene sulfonates, lignosulfonates, their derivatives and mixtures thereof. The volatile organics are then forced from the soil as the soil is more attracted to the admixture than it is to the volatile organic contaminants.

DETAILED DESCRIPTION OF THE INVENTION

Organic pollutants are contained and held within the soil most cohesively by soil particles with large surface areas. Soils comprised of high organic content are believed to absorb the organic contaminants to the greatest degree. The more hydrophilic the organic pollutant, the greater the affinity these compounds have for the organic matter in the soil. This results in a greatly diminished clean-up rate using the microbial biodegradable techniques known in the art. The method of the present invention comprises a method for the decontamination of soil comprising the extraction of volatile organic compounds from the soil by contacting the contaminated soil with a dispersing/desorption chemical admixture.

The present invention comprises the desorption of the volatile organic pollutants from the soil using the salts of naphthalene sulfonates and lignosulfonates and their derivatives. The process comprises essentially extracting the known polluted soil from the area of contamination which is then mixed together with a pozzolanic material such as a cement or fly ash and combinations thereof in which the amount of pozzolan is from about 5.0 wt % to about 15 wt % of the total weight of the soil. Generally, soil extractions are taken consisting of about 1 cubic yard or larger. Water is added to the soil/cement mixture in an amount such that the water:cement weight ratio may be varied from about 0.8:1.0 to about 1.5:1.0, respectively.

Cements and other pozzolanic materials useful in preparing the soil cement mixture and initially mixed into the contaminated soil extraction may be any known cement such as portland cement and the like. Fly ashes are also a suitable additive and are less expensive to use.

After mixing the soil and cement for about 1–15 minutes, the dispersing/desorption agent consisting of a chemical admixture of the naphthalene sulfonate or lignosufonate salt derivatives is added. Preferably, the chemical admixture is comprised of calcium naphthalene sulfonates and their derivatives, sodium naphthalene sulfonates and their derivatives, calcium lignosulfonate and their derivatives, sodium lignosulfonate and their derivatives and mixtures thereof.

The naphthalene sulfonate and lignosulfonate salts are added to the soil/cement mixture as an aqueous solution wherein the dispersing/desorption agent comprises from about 10 wt % to about 60 wt % of the solution depending on the application. The liquid chemical admixture is then added to the soil to be treated at a dose ratio of from about 0.5 gallons to about 5.0 gallons per 1,000 pounds of soil. Preferably, the chemical admixture is added in an amount of from about 0.5 to about 2.5 gallons. The amount used is dictated to a certain extent by the degree of pollution and the amount of organic contaminants existing in the soil. The system is then mixed again for another 10–15 minutes. Any heavy duty industrial mixers that can handle soil sample volumes of one cubic yard or greater may be used for this purpose. The liquid chemical admixture acts as a water reducing agent which allows the mixture to become very fluid without requiring the addition of a lot of water.

During this second 1.0–15 minute mix, the volatile organic contaminants are released from the soil since the soil is more attracted to the dispersing/desorption agent than it is to the volatile organic. The soil with the disassociated organic pollutants remains in the mixer while the volatile organics are vented out of the system and captured by a carbon filter where the contaminants are collected. The process may be repeated one or more times if necessary depending on the degree of soil contamination. When the soil is determined to be decontaminated to within acceptable parameters as determined by a TCLP test, the soil is put back into the ground from whence it was taken.

Other excipients may optionally be added to the dispersing/desorption agent of the present invention as modifying agents in minor amounts. Biocides for the killing of undesirable microorganisms such as 3,5 Dimethyl Tetrahydro-2H-1,3,5 Thiadiazine 2-Thiane may be incorporated together with set enhancers such as triethanolamine and set accelerators such as sodium thiocyanate.

Industrial waste pollutants commonly found in contaminated soil areas are successfully desorbed therefrom by the process of the present invention. These compounds comprise a wide variety of hydrocarbons such as polyaromatic hydrocarbons and their derivatives, phenols and their derivatives, anilines and their derivatives, furanes and their derivatives, ethyl benzenes and their derivatives, xylenes and their derivatives, dioxins and their derivatives, biphenyls and their derivatives, phenanthrene and its derivatives and a vast number of other insecticides and herbicides. The polychlorinated hydrocarbons is an oft-occurring example of derivatives of these compounds and they also are readily desorbed from polluted soil extractions.

The following examples are provided to more fully disclose and specifically teach the compositions and methods of the present invention. They are for illustrative purposes only, and it is recognized that minor changes and variations can be made with respect to the compositions themselves and the parameters of using them in the treatment process of the present invention. To the extent that any such variations do not materially alter or change the final product or process of treatment, they are to be considered as falling within the spirit and scope of the present invention as recited by the claims that follow.

EXAMPLE 1

The following ingredients were combined to prepare the dispersing/desorption agent of the present invention:

| # | Ingredient | Weight percent |
| --- | --- | --- |
| 1 | Water | Q.S. to = 100% |
| 2 | Calcium Naphthalene Sulfonate Condensate Liquid | 40.00% |

EXAMPLE 2

The following ingredients were combined to prepare a dispersing/desorption agent of the present invention:

| # | Ingredient | Weight percent |
| --- | --- | --- |
| 1 | Water | Q.S. to = 100% |
| 2 | Calcium Naphthalene Sulfonate Condensate Powder | 40.00% |

EXAMPLE 3

The following ingredients were combined to prepare a third embodiment of the present invention:

| # | Ingredient | Weight percent |
| --- | --- | --- |
| 1 | Water | Q.S. to = 100% |
| 2 | Sulfonated Naphthalene Condensate Sodium Salt Sol'n | 39.6810% |
| 3 | Triethanolamine, Crude | 0.7960% |

EXAMPLE 4

The following ingredients were combined to prepare a dispersing/desorption agent of the present invention:

| # | Ingredient | Weight percent |
| --- | --- | --- |
| 1 | Water | Q.S. to = 100% |
| 2 | Formaldehyde Naphthalene Sulfonic Acid Condensate Sodium Salt Powder | 39.6810% |
| 3 | Triethanolamine, Crude | 0.7960% |

EXAMPLE 5

A fifth formulation of the dispersion/desorption agent was prepared by mixing the following:

| # | Ingredient | Weight percent |
|---|---|---|
| 1 | Water | Q.S. to = 100% |
| 2 | Triethanolamine, Crude | 1.3430% |
| 3 | Sulfonated Napbthalene Condensate Sodium Salt Sol'n | 10.0730% |
| 4 | SFAV | 0.4200% |
| 5 | 3,5 Dimethyl Tetrahydro-2H-1,3,5 Thiadiazine 2-Thione | 0.3000% |
| 6 | Sodium Lignosulfonate Sol'n-Desugared | 16.7890% |
| 7 | Sodium Thiocyanate | 3.3580% |

EXAMPLE 6

A soil sample extracted from a polluted site containing highly volatile organic contaminants was treated according to the process of the present invention. A soil sample weighing 5.8 kg. was put into a standard rotary mixer and to this was added 425 g. portland cement and 75 g. fly ash. Forty mls. of the dispersing/desorption agent from Example 1 was also added to the soil/pozzolan mixture. The system was then mixed for about 4.0 minutes when about 350 gm $H_2O$ was added. Mixing was continued for another 7.0–10.0 minutes at which time an additional 150 gm. water was added. The mixer was stopped two minutes later and the system set for approximately five minutes more.

During the procedure, the mixer was vented and any volatile carbon organics released were drawn off by the ventilation system which houses a carbon filter and Hna meter. The Hna meter measures the amount of volatile organics released from a contaminated soil sample and is a device well known in the art. The following readings show the increase in volatile organic contaminants given off during the mixer run. The readings given are in parts per million (ppm):

| Hna READING | |
|---|---|
| TIME | TIME |
| 0 | 9.5 |
| 1.0 min. | 22.5 |
| 3.0 min. | 23.0 |
| 7.0 min. | 19.9 |
| 10.0 min. | 5.5 |
| 13.0 min. | 6.4 |

The readings indicate a substantial release of volatile organics after only one minute of treatment with the dispersing/desorption chemical admixture which continued for another six to seven minutes followed by a reduction of released organics after ten. This is indicative of the chemical admixture's ability to successfully decontaminate polluted soil extractions in a short period of time.

What I claim is:

1. A method for the decontamination of soil comprising the extraction of volatile organic compounds from the soil by contacting contaminated soil with a dispersing/desorption chemical admixture, said admixture comprising a dispersing/desorption agent selected from the group consisting of naphthalene sulfonates and salts thereof, lignosulfonates and salts thereof and mixtures thereof.

2. The method of claim 1 wherein said dispersing/desorption agent is selected from the group consisting of calcium naphthalene sulfonates, sodium naphthalene sulfonates, calcium lignosulfonates, sodium lignosulfonates and mixtures thereof.

3. The method of claim 2 further comprising the initial mixing of a pozzolanic material into said soil.

4. The method of claim 3 wherein said pozzolanic material is selected from the group consisting of cements, fly ash and mixtures thereof.

5. The method of claim 1 wherein said dispersing/desorption chemical admixture is an aqueous solution.

6. The method of claim 5 wherein said aqueous solution comprises from about 10 wt % to about 60 wt % of said dispersing/desorption agent.

7. The method of claim 6 wherein said aqueous solution comprises from about 20 wt % to about 40 wt % of said dispersing/desorption agent.

8. The method of claim 7 wherein said aqueous solution is added to said soil in an amount of approximately 0.5 to about 5.0 gallons of said aqueous solution per one thousand pounds of soil.

9. The method of claim 8 wherein said solution is added in an amount of from about 0.5 to about 2.5 gallons of solution per one thousand pounds of soil.

10. The method of claim 9 wherein said aqueous solution further comprises one or more modifier agents selected from the group consisting of triethanolamine, biocides and thiocyanates.

11. The method of claim 1 wherein said volatile organic compounds are selected from the group consisting of hydrocarbons, phenols, anilines, furans and dioxins.

12. The method of claim 1 wherein said hydrocarbons are selected from the group consisting of polyaromatic hydrocarbons, xylenes, ethylbenzenes and mixtures thereof.

13. The method of claim 12 wherein said polyaromatic hydrocarbons are selected from the group consisting of biphenyls and phenanthrene.

14. The method of claim 1 wherein said volatile organic compounds are polychlorinated hydrocarbons.

15. The method of claim 14 wherein said cement is selected from the group consisting of portland cement.

16. A method for the removal of volatile organic contaminants from contaminated soil comprising combining contaminated soil with a material selected from the group consisting of cement, fly ash or mixtures thereof, and adding thereto a dispersing/desorption chemical admixture, said dispersing/desorption chemical admixture comprising a dispersing/desorption agent selected from the group consisting of naphthalene sulfonates and salts thereof, lignosulfonates and salts thereof and mixtures thereof.

* * * * *